United States Patent
Asai

(10) Patent No.: US 11,100,318 B2
(45) Date of Patent: Aug. 24, 2021

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventor: Keita Asai, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 0 days.

(21) Appl. No.: 16/543,665

(22) Filed: Aug. 19, 2019

(65) Prior Publication Data
US 2020/0311408 A1 Oct. 1, 2020

(30) Foreign Application Priority Data

Mar. 25, 2019 (JP) .............................. JP2019-057422

(51) Int. Cl.
 *G06K 9/00* (2006.01)
 *G06K 9/20* (2006.01)
 *G06F 3/0483* (2013.01)

(52) U.S. Cl.
 CPC ..... *G06K 9/00449* (2013.01); *G06K 9/00671* (2013.01); *G06K 9/2081* (2013.01); *G06F 3/0483* (2013.01); *G06K 2209/01* (2013.01); *G06K 2209/21* (2013.01)

(58) Field of Classification Search
 CPC ........... G06K 9/00449; G06K 9/00671; G06K 9/2081; G06K 2209/01; G06K 2209/21; G06F 3/0483
 See application file for complete search history.

(56) References Cited

U.S. PATENT DOCUMENTS

| | | | |
|---|---|---|---|
| 6,501,864 B1* | 12/2002 | Eguchi | G06K 9/00449 382/306 |
| 9,373,029 B2* | 6/2016 | Hull | G06K 9/00449 |
| 9,910,566 B2* | 3/2018 | Lehoux | G06F 40/174 |
| 10,701,232 B1* | 6/2020 | Yoshidome | H04N 1/00968 |
| 10,740,638 B1* | 8/2020 | Annis | G06K 9/64 |
| 2006/0165295 A1* | 7/2006 | Matsueda | G06K 9/033 382/224 |
| 2010/0312725 A1* | 12/2010 | Privault | G06Q 10/10 706/12 |
| 2011/0141521 A1* | 6/2011 | Qiao | H04N 1/32112 358/1.16 |
| 2011/0182508 A1* | 7/2011 | Ives | G06K 9/00449 382/164 |
| 2012/0026081 A1* | 2/2012 | Kompalli | G06F 3/0304 345/156 |
| 2013/0022330 A1* | 1/2013 | Carter | H04N 21/4788 386/224 |

(Continued)

FOREIGN PATENT DOCUMENTS

| JP | 2004-258706 A | 9/2004 |
|---|---|---|
| JP | 2012-208589 A | 10/2012 |

*Primary Examiner* — Yu Chen
(74) *Attorney, Agent, or Firm* — Oliff PLC

(57) ABSTRACT

An information processing apparatus includes a display controller configured to perform a control to display an image area extracted from an undefined area other than a defined area that is defined in advance as a recognition target, on a confirmation screen for displaying a recognition result of characters entered in a document.

15 Claims, 12 Drawing Sheets

(56) References Cited

U.S. PATENT DOCUMENTS

| | | | |
|---|---|---|---|
| 2014/0019905 A1* | 1/2014 | Kim | G06F 3/0484 |
| | | | 715/780 |
| 2015/0146266 A1* | 5/2015 | Nakao | H04N 1/00374 |
| | | | 358/452 |
| 2017/0091546 A1* | 3/2017 | Shigeeda | H04N 1/32144 |
| 2017/0091547 A1* | 3/2017 | Shigeeda | G06K 9/2054 |
| 2018/0260363 A1* | 9/2018 | Takumi | G06F 40/53 |
| 2019/0286897 A1* | 9/2019 | Asano | G06K 9/00449 |
| 2020/0026752 A1* | 1/2020 | Ishikura | G06F 40/174 |
| 2020/0104350 A1* | 4/2020 | Allen | G06F 40/169 |

* cited by examiner

RULE NAME: DELETE IMAGE ~70A

— IN CASE WHERE FOLLOWING CONDITIONS ARE MET
☐ IN CASE WHERE "CHANGE" IS INCLUDED IN UNDEFINED CHARACTERS ~C1
☑ IN CASE WHERE  IS INCLUDED ~C2

— PROCESS TO BE EXECUTED — ~70C
☑ DELETE IMAGE AREA FROM UNDEFINED IMAGE AREA LIST ~P1
☐ REPLACE [ITEM NAME] BY [CHARACTERS TO BE CHANGED] ~P2
☐ REPLACE CLOSEST ITEM BY [CHARACTERS TO BE CHANGED] ~P3
☐ REPLACE ITEM AT END OF INSTRUCTION LINE BY [CHARACTERS TO BE CHANGED] ~P4
☐ ADD [CHARACTERS TO BE ADDED] TO CLOSEST ITEM ~P5
☐ ADD [CHARACTERS TO BE ADDED] TO ITEM AT END OF INSTRUCTION LINE ~P6

ENTIRE IMAGE DISPLAY ~70D
SAVE  CANCEL
~70B  ~70

62C: CHANGE SIZE TO HAKO102X SINCE SIZE IS SMALL

72D: ☐ REFLECT IN FORM DEFINITION

SAVE    CANCEL

72A

- A1 — ITEM NAME: CHANGE REQUEST
- MACHINE LEARNING MODULE: HANDWRITTEN JAPANESE ▼ — A4
- ☑ HIRAGANA    ☐ KATAKANA    ☑ KANJI    ☐ PERIOD
- ☑ NUMBERS    ☐ SYMBOL
- A2 — VALUE: CHANGE TO HAKO102X    A3 — OCR
- MASK SETTING: SETTING — A5    ☑ ENGLISH CAPITAL LETTERS
- ☐ ENGLISH SMALL LETTERS
- ☐ BACKSLASH

72B

- ITEM NAME: COMMENT
- MACHINE LEARNING MODULE: HANDWRITTEN JAPANESE ▼ — B1 B4
- ☑ HIRAGANA    ☑ KATAKANA    ☑ KANJI    ☐ PERIOD
- ☐ NUMBERS    ☐ SYMBOL
- VALUE: SIZE IS SMALL — B2    OCR — B3
- MASK SETTING: SETTING — B5    ☐ ENGLISH CAPITAL LETTERS
- ☐ ENGLISH SMALL LETTERS
- ☐ BACKSLASH

| | | | | |
|---|---|---|---|---|
| PROMOTION/DEVELOPMENT DEPARTMENT | APPROVAL SEAL OF PERSON-IN-CHARGE | | | PRESENT |
| PROMOTION/DEVELOPMENT DEPARTMENT | APPROVAL SEAL OF MANAGER | | | PRESENT |
| MANAGEMENT DEPARTMENT | APPROVAL SEAL OF PERSON-IN-CHARGE | | | PRESENT |
| MANAGEMENT DEPARTMENT | APPROVAL SEAL OF MANAGER | | | PRESENT |
| MANUFACTURING DEPARTMENT | APPROVAL SEAL OF PERSON-IN-CHARGE | | | ABSENCE |
| MANUFACTURING DEPARTMENT | APPROVAL SEAL OF MANAGER | | | ABSENCE |

76A

| | |
|---|---|
| PRODUCT NAME | ○○○○○○/AAA |
| NAME OF PERSON-IN-CHARGE OF PROMOTION/DEVELOPMENT DEPARTMENT | FUJI TARO |
| NAME OF PERSON-IN-CHARGE OF MANAGEMENT DEPARTMENT | KANRI MIRAI |
| SAMPLE DELIVERY ADDRESS | YOKOHAMA-SHI NISHI-KU MINATOMIRAI |
| SAMPLE DELIVERY DEPARTMENT | QUALITY MANAGEMENT DEPARTMENT 3 GROUP |
| PERSON-IN-CHARGE OF MANUFACTURING | SEISAN HANAKO |

76B

| MANAGEMENT NUMBER | TYPE | NUMBER OF PRODUCTS | MANUFACTURING START DATE | MANUFACTURING COMPLETION DATE | SHIPPING START DATE | REMARKS |
|---|---|---|---|---|---|---|
| ABCD001A | MAIN BODY | 1 | '18.04.18 | '18.04.20 | '18.04.30 | PLEASE MAKE COLOR BROWN |
| ABCD002A | ACCESSORY | 4 | '18.04.18 | '18.04.25 | '18.04.30 | |
| ABCD003A | ACCESSORY | 2 | '18.04.18 | '18.04.25 | '18.04.30 | |
| KONP005C | PACKING MATERIAL | - | - | - | - | |
| HAKO102X | OUTER CASE | 1 | - | - | - | |
| ABCD004A | | | | | | |

76C

| | |
|---|---|
| CHANGE REQUEST | CHANGE TO HAKO102X |
| COMMENT | SIZE IS SMALL |

76D

N1 → HAKO102X
N2 → ABCD004A

DEFINED AREA RECOGNITION RESULT → 76

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-057422 filed Mar. 25, 2019.

BACKGROUND

(i) Technical Field

The present disclosure relates to an information processing apparatus and a non-transitory computer readable medium.

(ii) Related Art

For example, JP-A-2004-258706 discloses a form definition data creation method of creating form definition data to be used in a case where character recognition processing of a form is performed. In the form definition data creation method, image data of the form is acquired, layout information of character information is extracted from the image data, and first definition data related to a position of a defined area is extracted from the layout information corresponding to the defined area which is designated. Further, in the form definition data creation method, character information in the vicinity or inside of the defined area is recognized, and the recognition result is converted to second definition data related to an attribute of the defined area.

In addition, JP-A-2012-208589 discloses a form recognition apparatus including a recognition dictionary and a form recognition unit that performs recognition processing of a form image. The form recognition unit includes a recognition priority setting unit that detects a character string from a form image and sets a recognition priority indicating an item name or an item value to the detected character string, and a recognition group setting unit that sets recognition groups organized in descending order of recognition priority. Further, the form recognition unit includes an item name-item value relationship extraction unit that extracts, for each recognition group, an item name-item value relationship from a pair of character strings in the recognition group, and an item name-item value relationship extraction completion determination unit that determines whether all of the item name-item value relationships to be read are extracted from the form image based on the item name-item value relationships extracted by the item name-item value relationship extraction unit. The item name-item value relationship extraction unit extracts the item name-item value relationships in order from the character strings of the recognition group having a highest recognition priority, and the item name-item value relationship extraction completion determination unit completes the form recognition processing in a case where it is determined that extraction of the item name-item value relationships is completed.

By the way, in a case where a recognition result of characters entered in a document is displayed and a user confirms the recognition result of the characters, important matters might entered in an area other than a defined area of the document that is defined in advance as a recognition target. In this case, the matters entered in the area other than the defined area are not displayed in the recognition result of the characters. For this reason, the user might overlook the matters without recognizing such matters.

SUMMARY

Aspects of non-limiting embodiments of the present disclosure relate to an information processing apparatus and a non-transitory computer readable medium capable of, in a case where a recognition result of characters entered in a document is displayed, preventing a user who confirms the recognition result of the characters from overlooking matters entered in an area other than a defined area that is defined in advance as a recognition target, compared to a case where only matters entered in the defined area which is defined in advance as a recognition target are displayed as the recognition result.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a display controller configured to perform a control to display an image area extracted from an undefined area other than a defined area that is defined in advance as a recognition target, on a confirmation screen for displaying a recognition result of characters entered in a document.

BRIEF DESCRIPTION OF THE DRAWINGS

Exemplary embodiment(s) of the present disclosure will be described in detail based on the following figures, wherein:

FIG. 4 is a view illustrating an example of a form image according to the exemplary embodiment;

FIG. 5 is a front view illustrating an example of a confirmation screen according to the exemplary embodiment;

FIG. 10 is a front view illustrating an example of the rule editing screen in a case where third processing according to the exemplary embodiment is performed;

FIG. 11 is a front view illustrating an example of an item addition screen according to the exemplary embodiment;

FIG. 12 is a front view illustrating an example of a recognition result editing screen according to the exemplary embodiment; and FIG. 13 is a diagram illustrating an example of a reflected recognition result according to the exemplary embodiment.

DETAILED DESCRIPTION

Hereinafter, an example of an exemplary embodiment according to the present disclosure will be described in detail with reference to the drawings.

Figure 1:
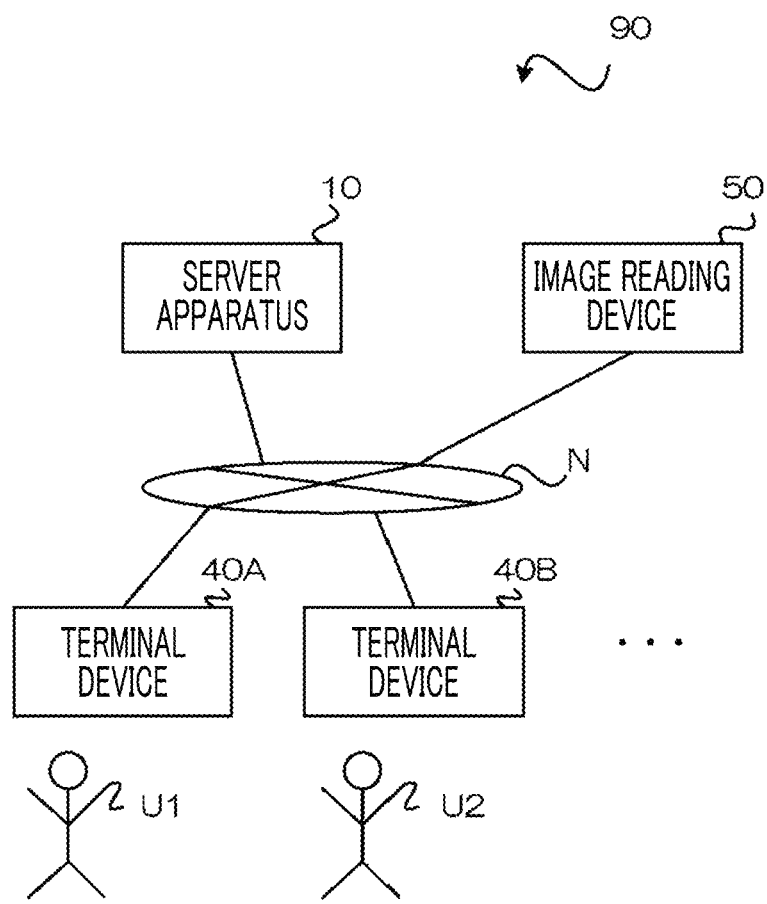
FIG. 1 is a diagram illustrating an example of a configuration of an information processing system according to an exemplary embodiment.

FIG. 1 is a diagram illustrating an example of a configuration of an information processing system 90 according to the present exemplary embodiment.

As illustrated in FIG. 1, the information processing system 90 according to the present exemplary embodiment includes a server apparatus 10, terminal devices 40A, 40B, . . . , and an image reading device 50. The server apparatus 10 is an example of an information processing apparatus.

The server apparatus 10 is connected to the terminal devices 40A, 40B, . . . , and the image reading device 50 via a network N so as to be able to communicate with each other. As an example of the server apparatus 10, a general-purpose computer such as a server computer or a personal computer (PC) may be used. In addition, as an example of the network N, the Internet, a local area network (LAN), a wide area network (WAN), or the like may be used.

The image reading device 50 has a function of acquiring an image by optically reading a paper form or the like and transmitting the acquired image (hereinafter, referred to as a "form image") to the server apparatus 10. As the form, for example, various forms such as a manufacturing instruction including plural items may be used. In the form, handwritten characters, printed characters, and the like are entered for each of the plural items. As will be specifically described later, the server apparatus 10 acquires text data (hereinafter, also referred to as a "character string") of an image corresponding to each of the plural items by performing optical character recognition (OCR) processing on the form image received from the image reading device 50. The term "character string" refers to a series of one or more characters. Even a single character is referred to as a "character string". In the form, an area in which a description corresponding to an item can be entered is defined by a frame or the like. The area in which a description can be entered is defined as a recognition target area. The server apparatus 10 acquires a character string of an image corresponding to each of the plural items by performing OCR processing on the defined area.

The terminal device 40A is a terminal device operated by a confirmer (user) U1 who performs a confirmation operation. The terminal device 40B is a terminal device operated by a confirmer U2 who performs a confirmation operation. In a case where there is no need to distinguish the plural terminal devices 40A, 40B, . . . , the terminal devices 40A, 40B, . . . may be collectively referred to as the terminal device 40. In addition, in a case where there is no need to distinguish the plural confirmers U1, U2, . . . , the confirmers U1, U2, . . . may be collectively referred to as the confirmer U. As an example of the terminal device 40, a general-purpose computer such as a personal computer (PC), or a portable terminal device such as a smartphone or a tablet terminal may be used. In the terminal device 40, a confirmation operation application program (hereinafter, also referred to as "confirmation operation application") allowing the confirmer U to perform the confirmation operation is installed. The confirmation operation application generates and displays a user interface (UI) screen for confirmation operation.

The server apparatus 10 performs a control to display, on the UI screen of the terminal device 40, the image corresponding to each item included in the form image (hereinafter, referred to as an "item image") and the character string obtained by the OCR processing in association with each other. The confirmer U confirms whether or not the character string corresponding to the item image is correct, while checking the item image. In a case where confirming that the character string is correct, the confirmer U inputs the character string on the UI screen as it is. In a case where it is confirmed that the character string is not correct, the confirmer U inputs a correct character string on the UI screen. The terminal device 40 transmits the character string which is input via the UI screen, to the server apparatus 10, as a confirmation result. The server apparatus 10 outputs a final recognition result based on the confirmation result from the terminal device 40, and performs a control to display the final recognition result on the UI screen of the terminal device 40.

Figure 2:
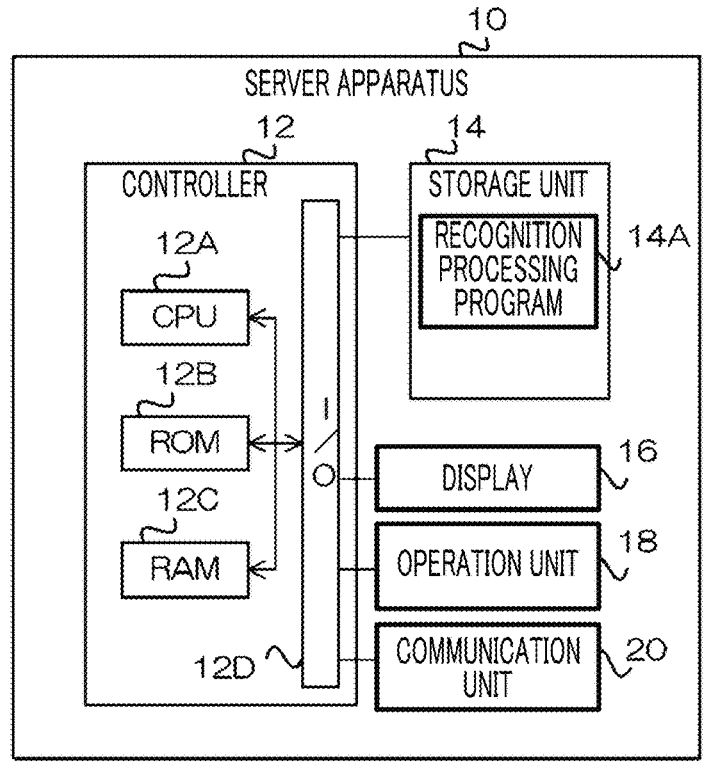
FIG. 2 is a block diagram illustrating an example of an electrical configuration of a server apparatus according to the exemplary embodiment.

FIG. 2 is a block diagram illustrating an example of an electrical configuration of the server apparatus 10 according to the present exemplary embodiment.

As illustrated in FIG. 2, the server apparatus 10 according to the present exemplary embodiment includes a controller 12, a storage unit 14, a display 16, an operation unit 18, and a communication unit 20.

The controller 12 includes a central processor (CPU) 12A, a read only memory (ROM) 12B, a random access memory (RAM) 12C, and an input/output interface (I/O) 12D. These units are connected to each other via a bus.

Each of functional units including the storage unit 14, the display 16, the operation unit 18, and the communication unit 20 is connected to the I/O 12D. Each functional unit is able to communicate with the CPU 12A via the I/O 12D in a bidirectional communication manner.

The controller 12 may serve as a sub controller that controls a part of operations of the server apparatus 10. Alternatively, the controller 12 may serve as a part of a main controller that controls the entire operations of the server apparatus 10. For some or all of the blocks of the controller 12, for example, an integrated circuit such as large scale integration (LSI), or an integrated circuit (IC) chipset may be used. A separate circuit may be used for each of the blocks, or integrated circuits may be used for some or all of the blocks. The blocks may be integrally provided as an integrated body, or some of the blocks may be separately provided. In each block, a part of the block may be separately provided. In the present exemplary embodiment, an integrated circuit such as LSI is used for the controller 12. On the other hand, a dedicated circuit or a general-purpose processor may be used for the controller 12.

As the storage unit 14, for example, a hard disk drive (HDD), a solid state drive (SSD), a flash memory, or the like may be used. The storage unit 14 stores a recognition processing program 14A for performing recognition processing of an undefined area according to the present exemplary embodiment. The recognition processing program 14A may be stored in the ROM 12B.

The recognition processing program 14A may be installed in advance, for example, in the server apparatus 10. The recognition processing program 14A may be appropriately installed in the server apparatus 10 by being stored in a non-volatile storage medium or being distributed via the network N. As an example of the non-volatile storage medium, a compact disc read only memory (CD-ROM), a magneto-optical disc, an HDD, a digital versatile disc read only memory (DVD-ROM), a flash memory, a memory card, or the like may be used.

As the display 16, for example, a liquid crystal display (LCD), an organic electroluminescence (EL) display, or the like may be used. The display 16 may integrally include a touch panel. As the operation unit 18, for example, devices for operation input such as a keyboard, a mouse, and the like may be provided. The display 16 and the operation unit 18 receive various instructions from the user of the server apparatus 10. The display 16 displays various information such as a result of processing executed according to the instruction received from the user, a notification according to processing, and the like.

The communication unit 20 is connected to the network N such as the Internet, a LAN, or a WAN, and is able to communicate with the image reading device 50 and the terminal device 40 via the network N.

By the way, as described above, in a case where a recognition result of characters entered in a document such as a form is displayed and a user confirms the recognition result of the characters, important matters might be entered in an area other than a defined area of the document that is defined in advance as a recognition target. However, since matters entered in the area other than the defined area are not displayed in the recognition result of the characters, the user might overlook such matters without being aware of such matters.

Figure 3:
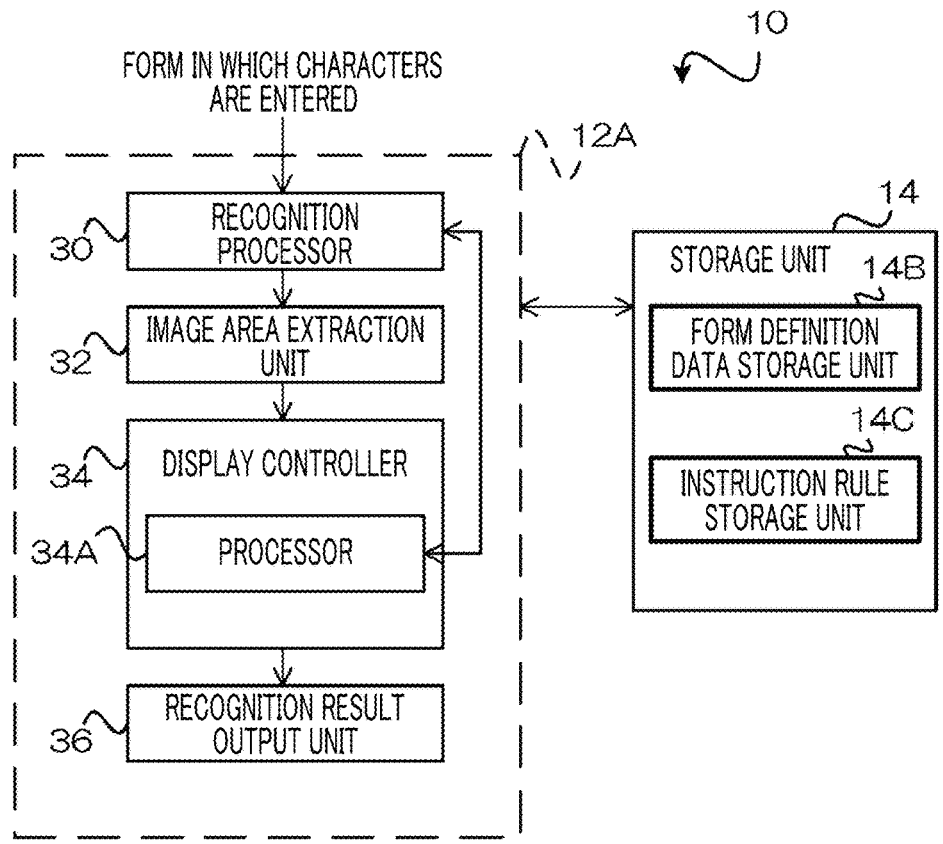
FIG. 3 is a block diagram illustrating an example of a functional configuration of the server apparatus according to the exemplary embodiment.

Therefore, the CPU 12A of the server apparatus 10 according to the present exemplary embodiment functions as respective units illustrated in FIG. 3 by loading the recognition processing program 14A stored in the storage unit 14 into the RAM 12C and executing the loaded recognition processing program 14A.

FIG. 3 is a block diagram illustrating an example of a functional configuration of the server apparatus 10 according to the present exemplary embodiment.

As illustrated in FIG. 3, the CPU 12A of the server apparatus 10 according to the present exemplary embodiment functions as a recognition processor 30, an image area extraction unit 32, a display controller 34, and a recognition result output unit 36. In the present exemplary embodiment, a case where a form such as a manufacturing instruction is used as an example of a document will be described.

The storage unit 14 according to the present exemplary embodiment includes a form definition data storage unit 14B that stores form definition data, and an instruction rule storage unit 14C that stores an instruction rule (which will be described later).

The recognition processor 30 according to the present exemplary embodiment acquires a character string as a recognition result of an image included in a defined area, for example, from a form image illustrated in FIG. 4 (which will be described later), based on the form definition data stored in the form definition data storage unit 14B. The form image is an example of a form in which characters are entered. The form image includes the defined area that is defined in advance as a recognition target. The defined area includes plural existing items.

The image area extraction unit 32 according to the present exemplary embodiment extracts an image area from an undefined area that is an area other than the defined area which is defined in advance as the recognition target in the form image. Here, the image area refers to an area including an unspecified image (for example, a handwritten character, a stamp, or the like) in the undefined area. The image area is represented, for example, as a rectangular area surrounding an image.

As an example, the display controller 34 according to the present exemplary embodiment performs a control to display the image area extracted from the undefined area on a confirmation screen illustrated in FIG. 5 (which will be described later). The confirmation screen is a screen for displaying the recognition result of the characters entered in the form. That is, the confirmation screen is a screen for displaying the character string acquired as the recognition result by the recognition processor 30 and the image area extracted by the image area extraction unit 32.

The display controller 34 includes a processor 34A. As an example, the processor 34A selectively performs any one of first processing, second processing, and third processing. The first processing is processing of adding a first character string that is the recognition result of the image area to an item of the recognition result of the form in which characters are entered. The second processing is processing of changing a second character string that is a recognition result of the defined area to the first character string. The third processing is processing of hiding the image area on the confirmation screen. Specific examples of the first processing, the second processing, and the third processing will be described later.

Further, the processor 34A performs processing of adding the first character string which is the recognition result of the image area and the item given to the first character string, to the recognition result of the form image, in association with each other. In a case where the first character string is recognized as plural character strings, the processor 34A performs processing of adding each of the plural character strings and an item given to each of the plural character strings to the recognition result of the form image, in association with each other (hereinafter, referred to as "item addition processing"). A specific example of the item addition processing will be described later.

The recognition result output unit 36 according to the present exemplary embodiment outputs a final recognition result based on the confirmation result on the confirmation screen. An output destination of the final recognition result is not particularly limited. For example, at least one of the display 16, the storage unit 14, or the terminal device 40 is the output destination.

Figure 4:
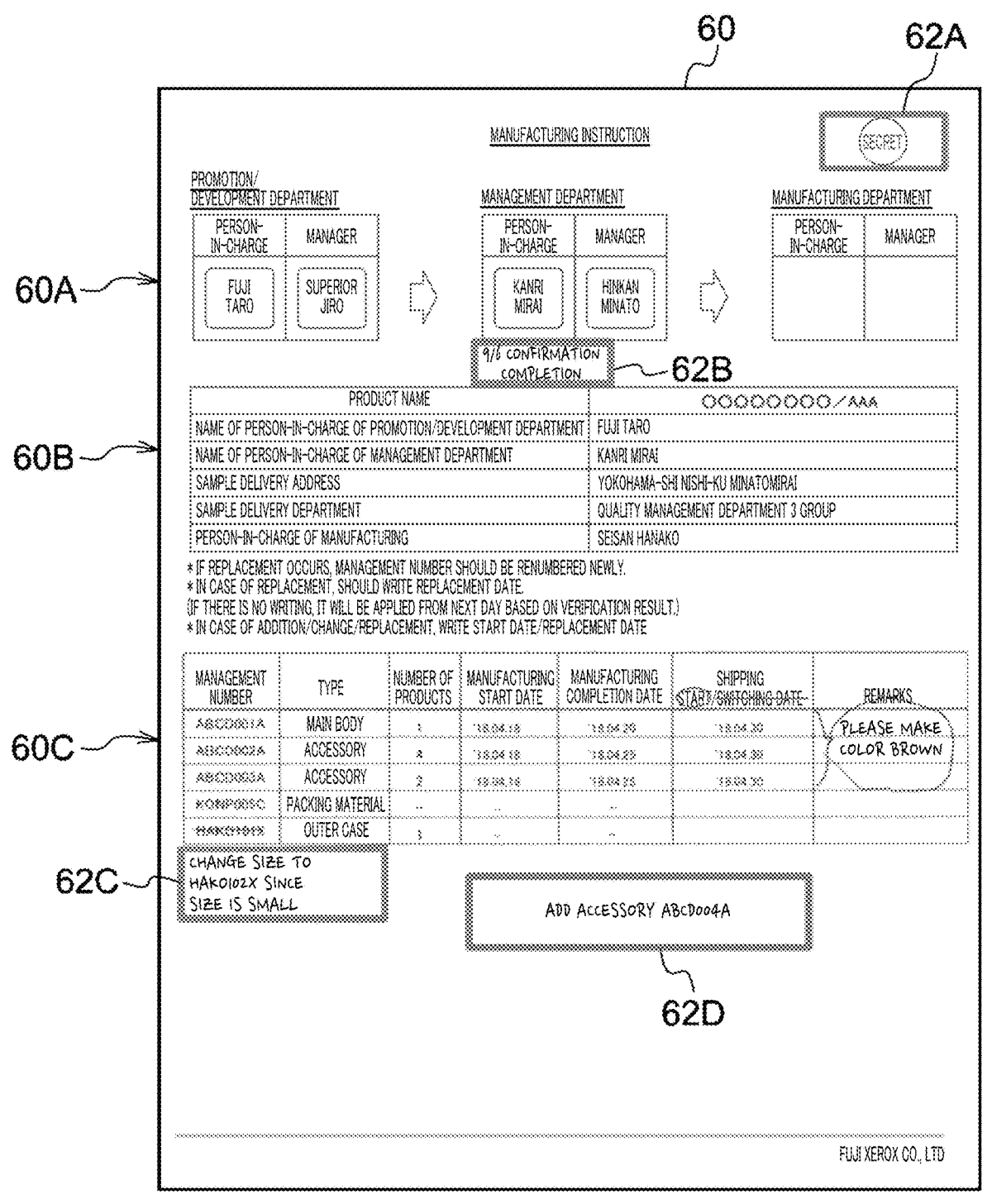

FIG. 4 is a view illustrating an example of a form image 60 according to the present exemplary embodiment.

The form image 60 illustrated in FIG. 4 includes plural defined areas 60A to 60C and plural image areas 62A to 62D. Although a manufacturing instruction is used as an example of the form image 60, the form image is not limited thereto. A general form may be used.

Each of the plural defined areas 60A to 60C is an area that is defined in advance as a recognition target. The definition contents of each defined area are stored as form definition data in the form definition data storage unit 14B. Specifically, in the defined area 60A, as plural existing items, seals of a person-in-charge and a manager of a promotion/development department, seals of a person-in-charge and a manager of a management department, and seals of a person-in-charge and a manager of a manufacturing department are defined. In addition, in the defined area 60B, as plural existing items, a product name, a name of the person-in-charge of the promotion/development department, a name of the person-in-charge of the management department, a sample delivery address, a sample delivery department, and a person-in-charge of manufacturing are defined. Further, in the defined area 60C, as plural existing items, a management number, a type, the number of products, a manufacturing start date, a manufacturing completion date, a shipping start/switching date, and remarks are defined.

Each of the plural image areas 62A to 62D is an area including an image in the undefined area, and is represented as a rectangular area in the example of FIG. 4. The image area 62A is an area including "secret" as a stamp image which is an example of a specific image. The image area 62B is an area including "9/6 confirmation completion" as a handwritten comment. The image area 62C is an area including "change size to HAKO102X since size is small" as a handwritten comment. The image area 62D is an area including "add accessory ABCD004A" as a handwritten comment.

Figure 5:
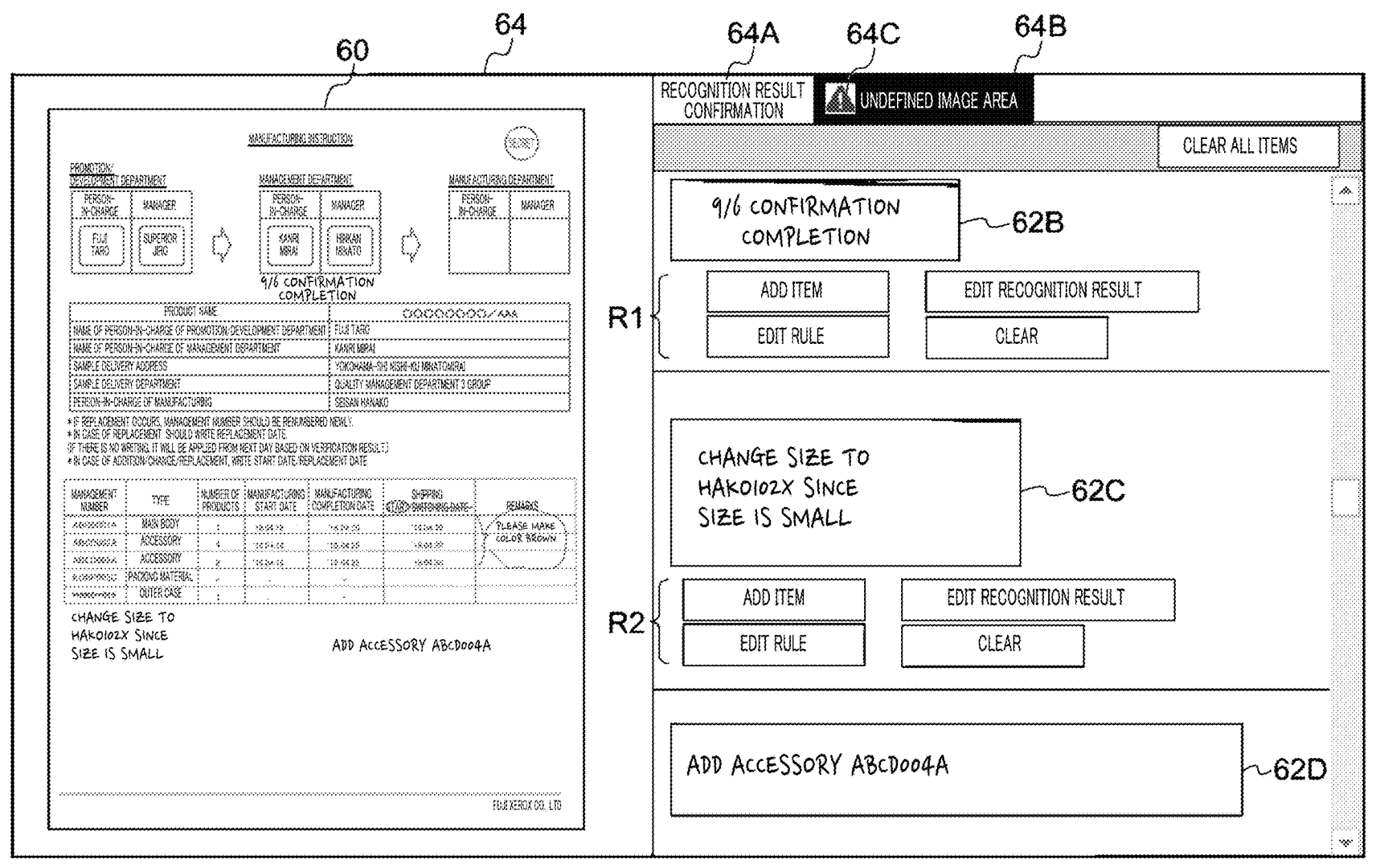

FIG. 5 is a front view illustrating an example of a confirmation screen 64 according to the present exemplary embodiment.

The confirmation screen 64 illustrated in FIG. 5 is a screen displayed on the terminal device 40. In the confirmation screen 64, the form image 60 is displayed on the left, and a recognition result confirmation screen 64A and an undefined image area screen 64B are switchably displayed on the right so as to be switchable.

The recognition result confirmation screen 64A is an example of a first screen for displaying a second character string that is a recognition result of the defined area. The undefined image area screen 64B is an example of a second screen for displaying the image area extracted from the undefined area. The example of FIG. 5 illustrates a case where the recognition result confirmation screen 64A and the undefined image area screen 64B are displayed while being switched by a tab operation. The switching of the screens is not limited to switching by the tab operation. The switching may be performed using an arrow key or the like.

In the example of FIG. 5, the undefined image area screen 64B is selected by the tab operation, and the undefined image area screen 64B is displayed. In a case where the image area is extracted from the undefined area, the undefined image area screen 64B is displayed while being more highlighted than the recognition result confirmation screen 64A. Thus, the user is able to recognize that the image area is extracted from the undefined area by viewing the undefined image area screen 64B. The highlighting is controlled by the display controller 34. As an example of the highlighting, as illustrated in FIG. 5, an exclamation mark 64C is given to a tab of the undefined image area screen 64B. On the other hand, the example of the highlighting is not limited to the exclamation mark 64C. For example, various methods such as a method of changing a background color of the tab to a relatively-noticeable color such as red or yellow, a method of underlining a character string of the tab (in the example of FIG. 5, "undefined image area"), a method of making a character string of the tab bold, a method of making a character string of the tab italic, or a method of adding a marker to a character string of the tab, may be used.

In the undefined image area screen 64B, a list of the plural image areas 62A to 62D extracted from the undefined area of the form image 60 is displayed so as to be scrollable. In the example of FIG. 5, a setting item group R1 is provided for the image area 62B, and a setting item group R2 is provided for the image area 62C. The contents of the setting item group R2 are the same as the contents of the setting item group R1. A setting item group which is the same as the setting item group R1 is provided for each of the image area 62A and the image area 62D. In the following description, in a case where there is no need to distinguish plural setting item groups R1, R2, . . . , the setting item groups R1, R2, . . . are collectively referred to as the setting item group R.

Figure 12:
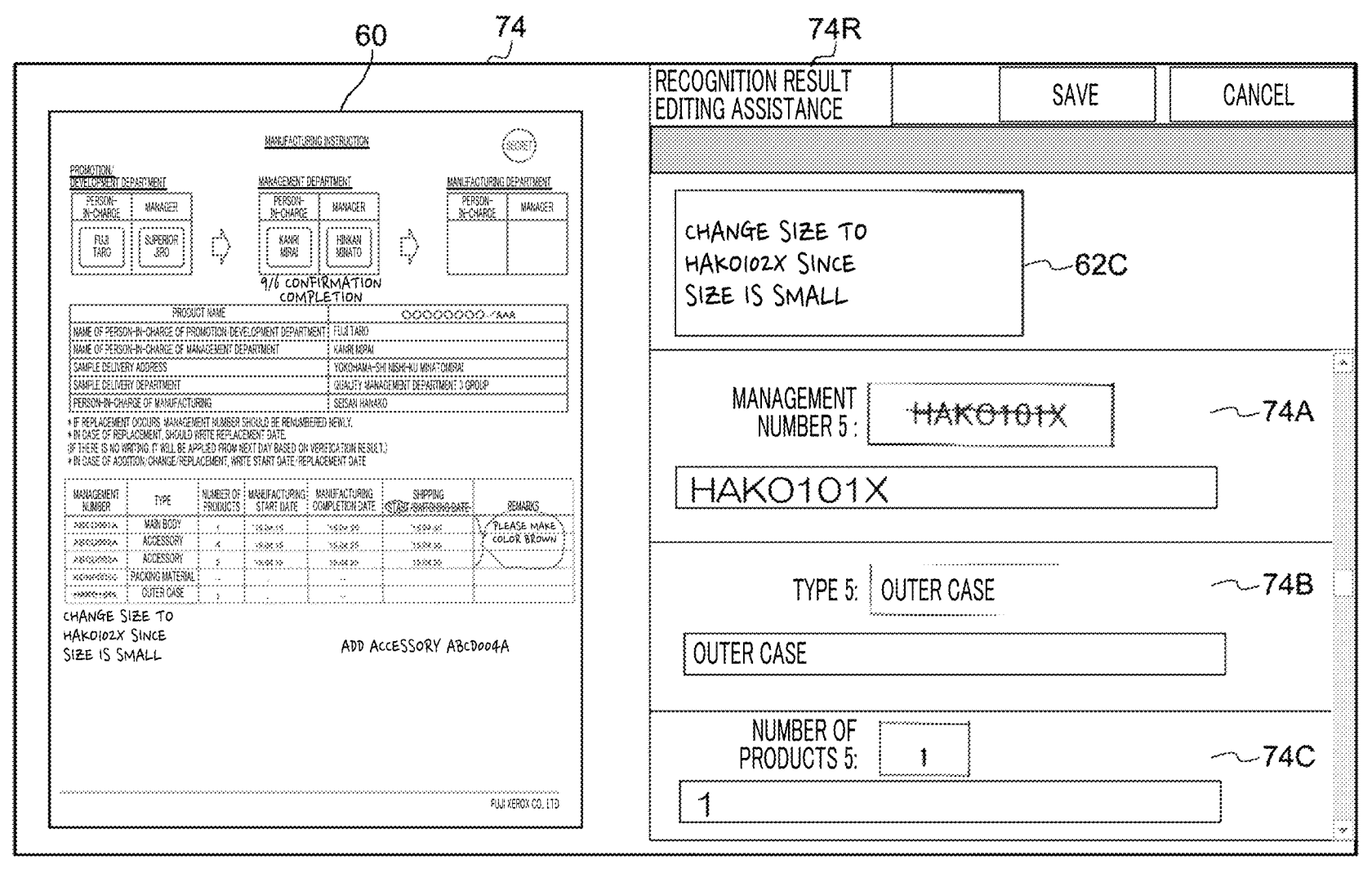

In the setting item group R, "add item", "edit rule", "edit recognition result", and "clear" are provided in a selectable manner. As an example, as illustrated in FIG. 11 to be described, the "add item" is to set a new item according to the image area based on the contents of the handwritten comment of the image area and input a value corresponding to each new item. As an example, as illustrated in FIG. 7 to FIG. 10 to be described, the "edit rule" (rule editing) is to setting an instruction rule according to the image area based on the contents of the handwritten comment of the image area and edit existing items of the defined area according to the instruction rule. As an example, as illustrated in FIG. 12 to be described, the "edit recognition result" (recognition result editing) is to edit existing items of the defined area based on the contents of the handwritten comment of the image area. The "clear" (clearing) is to delete the handwritten comment of the image area from the list of the undefined image area in a case where the handwritten comment of the image area is unnecessary.

Next, an operation of the server apparatus 10 according to the present exemplary embodiment will be described with reference to FIG. 6.

Figure 6:
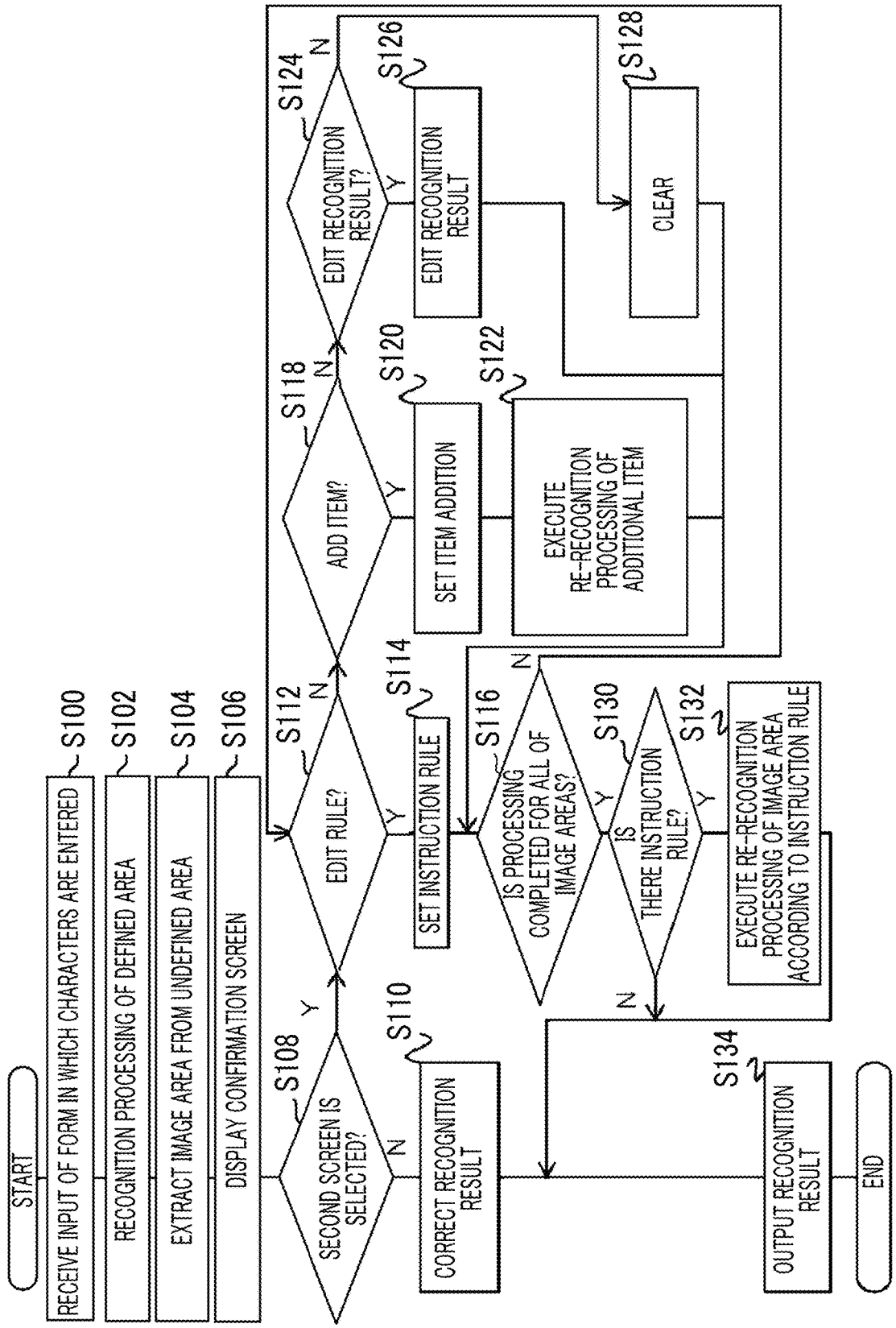
FIG. 6 is a flowchart illustrating an example of processing by a recognition processing program according to the exemplary embodiment.

FIG. 6 is a flowchart illustrating an example of processing by the recognition processing program 14A according to the present exemplary embodiment.

First, in a case where the server apparatus 10 is instructed to start recognition processing of the undefined area, the recognition processing program 14A is executed, and thus the following steps are performed.

In step S100 of FIG. 6, the recognition processor 30 receives input of the form image 60 as illustrated in FIG. 4, which is an example of a form in which characters are entered.

In step S102, the recognition processor 30 performs OCR processing on each image of the plural defined areas 60A to 60C obtained from the form image 60, based on the form definition data stored in the form definition data storage unit 14B. Thereby, the recognition processor 30 obtains a recognition result of each image of the plural defined areas 60A to 60C.

In step S104, the image area extraction unit 32 extracts the plural image areas 62A to 62D from the undefined area of the form image 60.

In step S106, as an example, the display controller 34 performs a control to display the confirmation screen 64 illustrated in FIG. 5 on the terminal device 40.

In step S108, the display controller 34 determines whether or not the undefined image area screen 64B, which is an example of the second screen, is selected from the confirmation screen 64. In a case where it is determined that the undefined image area screen 64B is not selected, that is, the recognition result confirmation screen 64A which is an example of the first screen is selected (in a case where the determination result is No), the process proceeds to step S110. On the other hand, in a case where it is determined that the undefined image area screen 64B is selected (in a case where the determination result is Yes), the process proceeds to step S112.

In step S110, the processor 34A performs processing of receiving, from the recognition result confirmation screen 64A, correction of the recognition result of the image of the existing item of each of the plural defined areas 60A to 60C, and reflecting the contents of the received correction to the recognition result.

On the other hand, in step S112, the processor 34A determines whether or not "edit rule" is selected for the confirmed image area among the plural image areas 62A to 62D included in the undefined image area screen 64B. In a case where it is determined that "edit rule" is selected (in a case where the determination result is Yes), the process proceeds to step S114, and in a case where it is determined that "edit rule" is not selected (in a case where the determination result is No), the process proceeds to step S118.

Figure 7:
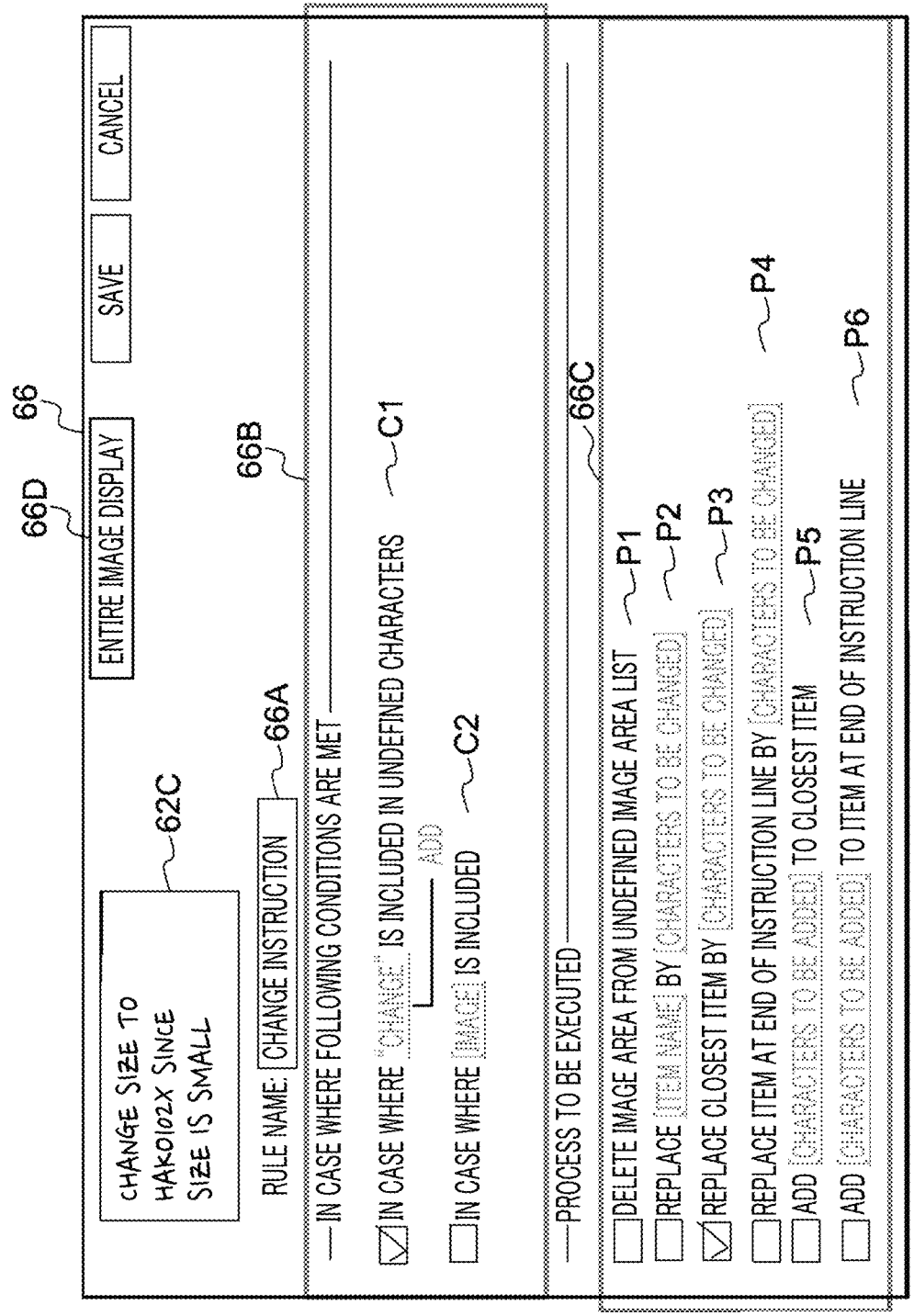
FIG. 7 is a front view illustrating an example of a rule editing screen in a case where second processing according to the exemplary embodiment is performed.
Figure 9:
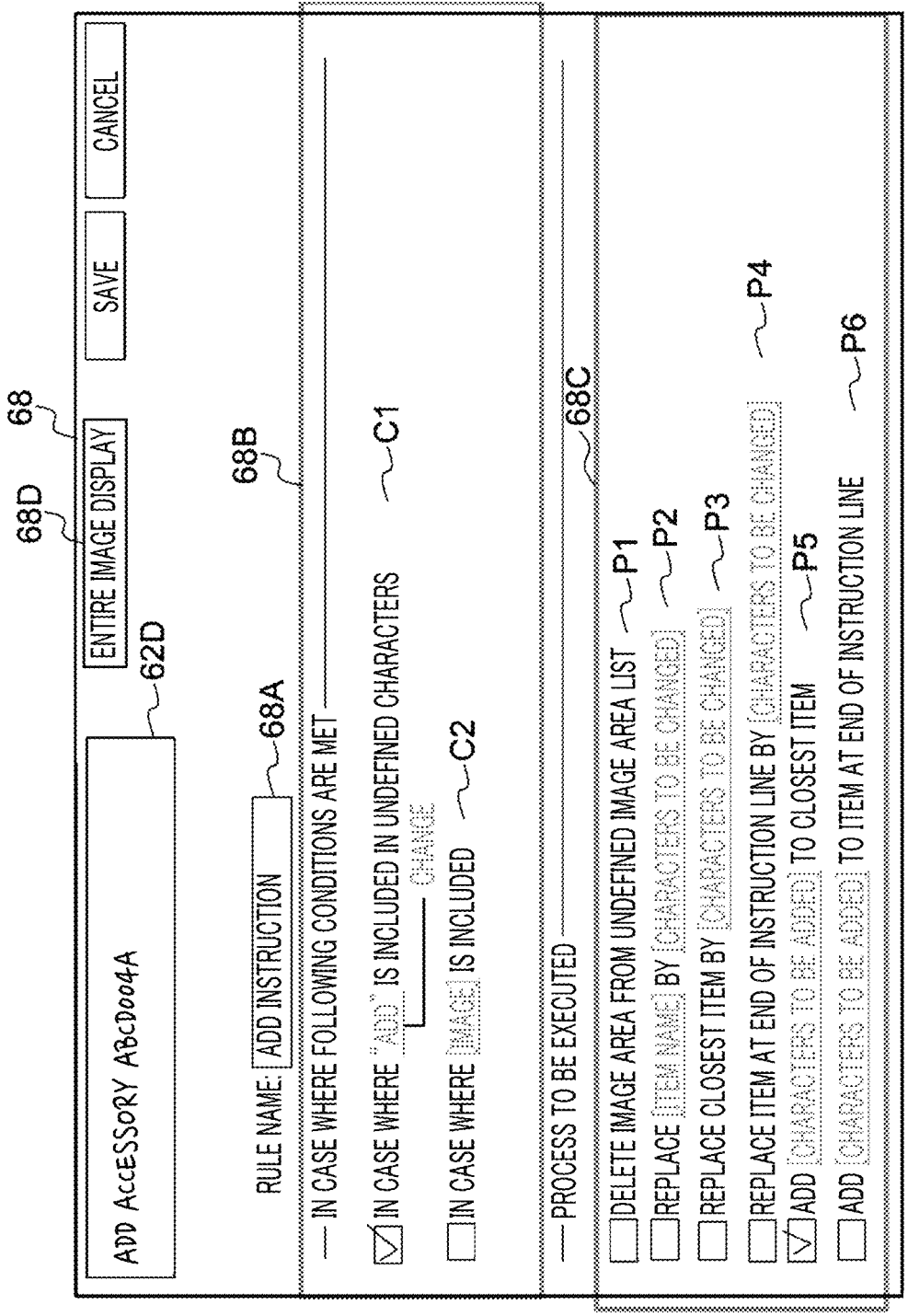
FIG. 9 is a front view illustrating an example of the rule editing screen in a case where first processing according to the exemplary embodiment is performed.

In step S114, the processor 34A performs a control to display a rule editing screen illustrated in FIGS. 7, 9, and 10 as an example, on the terminal device 40, and receives setting of the instruction rule.

FIG. 7 is a front view illustrating an example of a rule editing screen 66 in a case where second processing according to the present exemplary embodiment is performed.

On the rule editing screen 66 illustrated in FIG. 7, a rule name input field 66A, a condition designation field 66B, an execution processing designation field 66C, and an entire image display button 66D are displayed.

In a case where the entire image display button 66D is selected and operated on the rule editing screen 66, the form image 60 is opened and displayed in another window. The user is able to perform a setting operation on the rule editing screen 66 while confirming the form image 60.

The rule editing screen 66 is a screen for setting an instruction rule related to the second processing for the image area 62C including "change size to HAKO102X since size is small" as a handwritten comment.

The rule name input field 66A is a field for inputting a rule name to be set for the image area 62C, and in the example of FIG. 7, "change instruction" is input. In addition, in the condition designation field 66B, a check box of a condition C1 is checked among plural conditions C1 and C2. The condition C1 includes a condition statement "in a case where "change" is included in undefined characters". The undefined characters of the condition statement correspond to the first character string as the recognition result of the image area 62C. In addition, in a case where the user clicks the underlined character string (in the example in FIG. 7, "change") of the condition statement, another window (not illustrated) of a character string candidate list is opened, and the underlined character string may be changed to another character string (in the example of FIG. 7, "add").

Further, in the execution processing designation field 66C, a check box of processing P3 is checked among plural pieces of processing P1 to P6. In a case of the second processing, processing P2 or processing P4 may be designated.

Processing P3 includes the processing contents "replace the closest item by [characters to be changed]". As the characters to be changed in [ ], an appropriate value may be designated by the user. In the example of FIG. 7, "HAKO102X" is designated. In addition, the processing P2 includes the processing contents "replace [item name] by [characters to be changed]". The processing P2 is designated in a case where an item value to be changed is determined in advance. In the example of FIG. 7, as the item name in [ ], "HAKO101X" is designated, and as the characters to be changed in [ ], "HAKO102X" is designated. Further, the processing P4 includes the processing contents "replace an item at the end of an instruction line by [characters to be changed]". As the characters to be changed in [ ], for example, as in the processing P3, "HAKO102X" is designated.

In the processing P3 and P4, as the characters to be changed in [ ], fixed characters may be used, and, for example, only "HAKO102X" may be extracted from "change size to HAKO102X since size is small" of the image area 62C, using a regular expression or the like.

Figure 8:
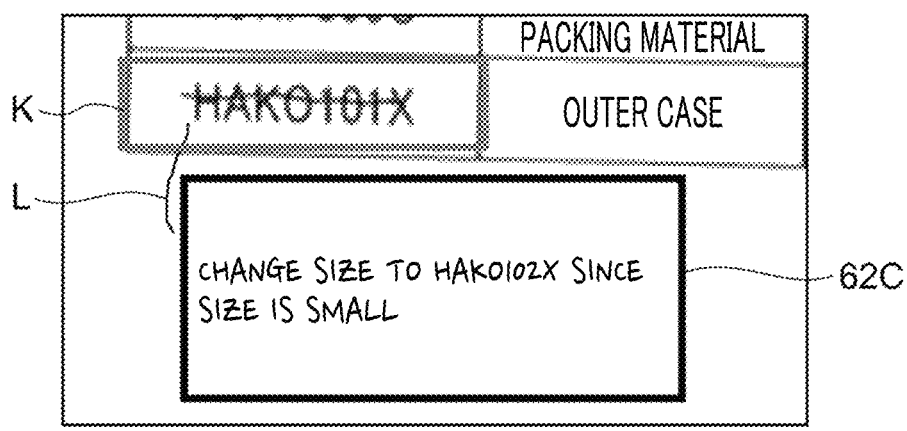
FIG. 8 is a diagram illustrating character string replacement processing according to the exemplary embodiment.

FIG. 8 is a diagram illustrating character string replacement processing according to the present exemplary embodiment.

As illustrated in FIG. 8, "HAKO101X" as a character string of an item K is located closest to the image area 62C.

Here, as described above, the second processing is processing of changing the second character string (in the example of FIG. 8, "HAKO101X") which is the recognition result of the defined area to the first character string (In the example of FIG. 8, "HAKO102X") which is the recognition result of the image area 62C. Specifically, in a case where the condition C1 and the processing P3 are designated, that is, in a case where the first character string includes characters representing changing, setting is performed such that the second character string of the item K closest to the image area 62C is changed to the first character string. In addition, in a case where the condition C1 and the processing P4 are designated, that is, in a case where the first character string includes characters representing changing, setting is performed such that the second character string of the item K closest to an end of an instruction line L extending from the image area 62C is changed to the first character string.

A positional relationship between the image area 62C and each existing item in the defined area is derived using, for example, coordinates. For example, the positional relationship between the image area 62C and each existing item is derived by obtaining a distance between the coordinates of the center of the image area 62C and the coordinates of the center of each existing item.

In the rule editing screen 66 illustrated in FIG. 7, in a case where a "save" button is selected and operated, the setting contents are stored in the instruction rule storage unit 14C, and in a case where a "cancel" button is selected and operated, the setting contents are canceled.

FIG. 9 is a front view illustrating an example of a rule editing screen 68 in a case where first processing according to the present exemplary embodiment is performed.

On the rule editing screen 68 illustrated in FIG. 9, a rule name input field 68A, a condition designation field 68B, an execution processing designation field 68C, and an entire image display button 68D are displayed.

In a case where the entire image display button 68D is selected and operated on the rule editing screen 68, as in the example of FIG. 7, the form image 60 is opened and displayed in another window. The user is able to perform a setting operation on the rule editing screen 68 while confirming the form image 60.

The rule editing screen 68 is a screen for setting an instruction rule related to the first processing for the image area 62D including "add accessory ABCD004A" as a handwritten comment.

The rule name input field 68A is a field for inputting a rule name to be set for the image area 62D, and in the example of FIG. 9, "add instruction" is input. In addition, in the condition designation field 68B, a check box of a condition C1 is checked among plural conditions C1 and C2. The condition C1 includes a condition statement "in a case where "add" is included in undefined characters". The undefined characters of the condition statement correspond to the first character string as the recognition result of the image area 62D. In addition, in a case where the user clicks the underlined character string (in the example in FIG. 9, "add") of the condition statement, another window (not illustrated) of a character string candidate list is opened, and the underlined character string may be changed to another character string (in the example of FIG. 9, "change").

Further, in the execution processing designation field 68C, a check box of processing P5 is checked among plural pieces of processing P1 to P6. In a case of the first processing, processing P6 may be designated.

The processing P5 includes the processing contents "add [characters to be added] to the closest item". As the characters to be added in [ ], an appropriate value may be designated by the user. In the example of FIG. 9, "ABCD004A" is designated. In addition, the processing P6 includes the processing contents "add [characters to be added] to an item at the end of an instruction line". As the characters to be added in [ ], for example, as in the processing P5, "ABCD004A" is designated. Here, although illustration is omitted, processing P7 may include the processing contents "add [characters to be added] to [item name]". The processing P7 is designated in a case where an item to which characters are to be added is determined in advance. In the example of FIG. 9, as the item name in [ ], "management number" is designated, and as the characters to be added in [ ], "ABCD004A" is designated.

In the processing P5 and P6, as the characters to be added in [ ], fixed characters may be used, and, for example, only "ABCD004A" may be extracted from "add accessory ABCD004A" of the image area 62D, using a regular expression or the like.

Here, as described above, the first processing is processing of adding the first character string (in the example of FIG. 9, "ABCD004A") which is the recognition result of the image area 62D to an item of the recognition result of the defined area (in the example of FIG. 9, "management number"). Specifically, in a case where the condition C1 and the processing P5 are designated, that is, in a case where the first character string includes characters representing adding, setting is performed such that the first character string is added to an item closest to the image area 62D. In addition, in a case where the condition C1 and the processing P6 are designated, that is, in a case where the first character string includes characters representing adding, setting is performed such that the first character string is added to an item closest to an end of an instruction line L extending from the image area 62D.

A positional relationship between the image area 62D and each existing item in the defined area is derived using, as described above, coordinates. For example, the positional relationship between the image area 62D and each existing item is derived by obtaining a distance between the coordinates of the center of the image area 62D and the coordinates of the center of each existing item.

In the rule editing screen 68 illustrated in FIG. 9, in a case where a "save" button is selected and operated, the setting contents are stored in the instruction rule storage unit 14C, and in a case where a "cancel" button is selected and operated, the setting contents are canceled.

FIG. 10 is a front view illustrating an example of a rule editing screen 70 in a case where third processing according to the present exemplary embodiment is performed.

On the rule editing screen 70 illustrated in FIG. 10, a rule name input field 70A, a condition designation field 70B, an execution processing designation field 70C, and an entire image display button 70D are displayed.

In a case where the entire image display button 70D is selected and operated on the rule editing screen 70, as in the example of FIG. 7, the form image 60 is opened and displayed in another window. The user is able to perform a setting operation on the rule editing screen 70 while confirming the form image 60.

The rule editing screen 70 is a screen for setting an instruction rule related to the third processing for the image area 62A including "secret" as a stamp image.

The rule name input field 70A is a field for inputting a rule name to be set for the image area 62A, and in the example of FIG. 10, "delete the image" is input. In addition, in the condition designation field 70B, a check box of a condition C2 is checked among plural conditions C1 and C2. The condition C2 includes a condition statement "in a case where [image] is included". The image in the condition statement corresponds to the recognition result of the image area 62A. In addition, a specific image is associated in advance with the [image] of the condition statement, and in the example of FIG. 10, "secret" and "checked" as examples of stamp images are associated with the [image] of the condition statement. The specific image is not limited to the stamp image, and may be an image representing a predetermined stamp. Examples of the stamp include a date stamp, a confirmation stamp of another department, and various stamps representing an important document, a circular document, and the like.

Further, in the execution processing designation field 70C, a check box of processing P1 is checked among plural pieces of processing P1 to P6.

The processing P1 includes the processing contents "delete the image area from an undefined image area list". Here, the undefined image area list means a list displayed on the undefined image area screen 64B (refer to FIG. 5).

Here, as described above, the third processing is processing of hiding the image area 62A on the confirmation screen 64 (refer to FIG. 5) (deleting the image area 62A from the confirmation screen 64). Specifically, in a case where the condition C2 and the processing P1 are designated, that is, in a case where a specific image is included in the image area 62A, setting is performed such that the image area 62A is automatically deleted from the list displayed on the undefined image area screen 64B.

In the rule editing screen 70 illustrated in FIG. 10, in a case where a "save" button is selected and operated, the setting contents are stored in the instruction rule storage unit 14C, and in a case where a "cancel" button is selected and operated, the setting contents are canceled.

Returning to FIG. 6, in step S116, the processor 34A determines whether or not confirmation processing is completed for all of the plural image areas 62A to 62D included in the undefined image area screen 64B. In a case where it is determined that the confirmation processing is completed for all of the plural image areas 62A to 62D (in a case where the determination result is Yes), the process proceeds to step S130, and in a case where it is determined that the confirmation processing is not completed for all of the plural image areas 62A to 62D (in a case where the determination result is No), the process returns to step S112 and the processing is repeated.

On the other hand, in step S118, the processor 34A determines whether or not "add item" is selected for the image area which is confirmed in step S112. In a case where it is determined that "add item" is selected (in a case where the determination result is Yes), the process proceeds to step S120, and in a case where it is determined that "add item" is not selected (in a case where the determination result is No), the process proceeds to step S124.

In step S120, the processor 34A performs a control to display an item addition screen illustrated in FIG. 11 as an example, on the terminal device 40, and receives setting of the item addition.

FIG. 11 is a front view illustrating an example of an item addition screen 72 according to the present exemplary embodiment.

On the item addition screen 72 illustrated in FIG. 11, a first item addition field 72A, a second item addition field 72B, an item addition button 72C, and a form definition reflection field 72D are displayed.

The item addition screen 72 is a screen for performing setting related to the item addition processing for the image area 62C including "change size to HAKO102X since size is small" as a handwritten comment.

In a case where the contents of the image area 62C are to be divided into plural items, in a case where the item addition button 72C is selected and operated, as illustrated in FIG. 11, the plural items are displayed in a settable state. In the example of FIG. 11, "change size to HAKO102X" and "size is small" are set as separate additional items. In a case where the item addition button 72C is not selected, the contents of the image area 62C are set as one additional item.

The first item addition field 72A includes an item name input field A1, a value input field A2, an OCR button A3, a machine learning module setting field A4, and a mask setting button A5. An item name of an item to be added is input to the item name input field A1. In the example of FIG. 11, "change request" is input. In addition, a type of a machine learning model to be used for OCR is set in the machine learning module setting field A4. In the example of FIG. 11, "handwritten Japanese" is set. Further, as a recognition target, for example, hiragana, Kanji, English capital letters, and numbers are set. The mask setting button A5 is a button for setting an area on which OCR is to be performed by masking an area on which OCR is not to be performed.

On the other hand, the second item addition field 72B includes an item name input field B1, a value input field B2, an OCR button B3, a machine learning module setting field B4, and a mask setting button B5. An item name of an item to be added is input to the item name input field B1. In the example of FIG. 11, "comment" is input. In addition, a type of a machine learning model to be used for OCR is set in the machine learning module setting field B4. In the example of FIG. 11, "handwritten Japanese" is set. Further, as a recognition target, for example, hiragana, katakana, and Kanji are set. The mask setting button B5 is a button for setting an area on which OCR is to be performed by masking an area on which OCR is not to be performed.

In step S122, the processor 34A instructs the recognition processor 30 to execute re-recognition processing of the additional item, and the process proceeds to step S116. Specifically, in the example of FIG. 11, in a case where the OCR button A3 is selected and operated, OCR is performed on the image area 62C according to the setting contents of each of the machine learning module setting field A4 and the mask setting button A5. In the value input field A2, a result of OCR executed by a selection operation of the OCR button A3 is input. In the example of FIG. 11, "change size to HAKO102X" is input. In the value input field A2, manual input is allowed. Similarly, in a case where the OCR button B3 is selected and operated, OCR is performed on the image area 62C according to the setting contents of each of the machine learning module setting field B4 and the mask setting button B5. In the value input field B2, a result of OCR executed by a selection operation of the OCR button B3 is input. In the example of FIG. 11, "size is small" is input. In the value input field B2, manual input is allowed.

In a case where a check box of the form definition reflection field 72D is checked, the setting contents are reflected in the form definition, and OCR is always performed on the additional item each time.

In the item addition screen 72 illustrated in FIG. 11, in a case where a "save" button is selected and operated, the setting contents are stored in the storage unit 14, and in a case where a "cancel" button is selected and operated, the setting contents are canceled.

On the other hand, in step S124, the processor 34A determines whether or not "edit recognition result" is selected for the image area which is confirmed in step S112. In a case where it is determined that "edit recognition result" is selected (in a case where the determination result is Yes), the process proceeds to step S126, and in a case where it is determined that "edit recognition result" is not selected (in a case where the determination result is No), the process proceeds to step S128.

In step S126, the processor 34A performs a control to display a recognition result editing screen illustrated in FIG. 12 as an example, on the terminal device 40, and receives editing of the recognition result. The process proceeds to step S116.

FIG. 12 is a front view illustrating an example of a recognition result editing screen 74 according to the present exemplary embodiment.

On the recognition result editing screen 74 illustrated in FIG. 12, the form image 60 is displayed on the left, and a recognition result editing assistance screen 74R is displayed on the right.

On the recognition result editing assistance screen 74R, as an example, the image area 62C is displayed, and plural recognition results 74A to 74C are displayed so as to be scrollable. The plural recognition results 74A to 74C are a part of recognition results obtained from each of the plural defined areas 60A to 60C.

The user confirms the contents of the image area 62C, and edits the recognition result according to the contents of the image area 62C. In the example of FIG. 12, "HAKO101X" of the recognition result 74A is edited to "HAKO102X".

In the recognition result editing screen 74 illustrated in FIG. 12, in a case where a "save" button is selected and operated, the editing contents are stored in the storage unit 14, and in a case where a "cancel" button is selected and operated, the editing contents are canceled.

On the other hand, in step S128, the processor 34A determines that "clear" is selected for the image area which is confirmed in step S112. In this case, the image area is deleted from the list of the undefined image area screen 64B, and the process proceeds to step S116.

In step S130, the processor 34A determines whether or not an instruction rule is set for each of the plural image areas 62A to 62D included in the undefined image area screen 64B. In a case where it is determined that an instruction rule is set (in a case where the determination result is Yes), the process proceeds to step S132, and in a case where it is determined that an instruction rule is not set (in a case where the determination result is No), the process proceeds to step S134.

In step S132, the processor 34A instructs the recognition processor 30 to execute re-recognition processing of the image area according to the instruction rule which is set in step S114, and edits the recognition result of the existing item included in the defined area according to the re-recognition result. For example, in a case of performing the first processing, the processor 34A performs processing of adding the recognition result to the item closest to the image area among the plural existing items, or performs processing of adding the recognition result to the item closest to the end of the line extending from the image area. In addition, in a case of performing the second processing, the processor 34A performs processing of changing the character string of the item closest to the image area among the plural existing items, or performs processing of changing the character string of the item closest to the end of the line extending from the image area. Further, in a case where the third processing is performed, the processor 34A performs processing of deleting the image area from the list of the undefined image area screen 64B.

In step S134, the recognition result output unit 36 outputs a reflected recognition result obtained by reflecting the re-recognition result of the image area extracted from the undefined area, to the recognition result of the defined area. Thereafter, a series of processing by the recognition processing program 14A is ended. An example of the reflected recognition result is illustrated in FIG. 13.

FIG. 13 is a diagram illustrating an example of a reflected recognition result 76 according to the present exemplary embodiment.

The reflected recognition result 76 illustrated in FIG. 13 includes plural recognition results 76A to 76D.

The recognition result 76A is a recognition result corresponding to the defined area 60A illustrated in FIG. 4, the recognition result 76B is a recognition result corresponding to the defined area 60B illustrated in FIG. 4, and the recognition result 76C is a recognition result corresponding to the defined area 60C illustrated in FIG. 4. The recognition result 76D is a recognition result added by the item addition processing. The recognition result 76D is a recognition result corresponding to the image area 62C illustrated in FIG. 4.

A recognized character string N1 is a recognition result which is changed from the existing item "HAKO101X" by the second processing. The recognized character string N1 represents "HAKO102X" obtained by recognizing the image area 62C. A recognized character string N2 is a recognition result which is added to the existing item "management number" by the first processing. The recognized character string N2 represents "ABCD004A" obtained by recognizing the image area 62D illustrated in FIG. 4.

As described above, according to the present exemplary embodiment, in a case where the recognition result of the form in which characters are entered is displayed, in addition to matters entered in the defined area which is defined in advance as a recognition target, matters extracted from the undefined area other than the defined area are displayed. Therefore, it is possible to prevent the user who confirms the recognition result of the form in which characters are entered from overlooking the matters entered in the undefined area.

In the above, the server apparatus is described as an example of the information processing apparatus according to the exemplary embodiment. The exemplary embodiment may be implemented in a form of a program causing a computer to execute the function of each unit of the server apparatus. The exemplary embodiment may be implemented in a form of a computer readable storage medium storing the program.

On the other hand, the configuration of the server apparatus described in the exemplary embodiment is an example, and may be modified according to a situation without departing from the spirit of the inventions.

In addition, the flow of processing of the program described in the exemplary embodiment is also an example. For example, unnecessary steps may be deleted, new steps may be added, or the processing order may be changed without departing from the spirit of the inventions.

Further, although, in the exemplary embodiment, a case where the processing according to the exemplary embodiment is implemented by a software configuration using a computer by executing the program has been described, the present invention is not limited thereto. The exemplary embodiment may be implemented by, for example, a hardware configuration or a combination of a hardware configuration and a software configuration.

The foregoing description of the exemplary embodiments of the present disclosure has been provided for the purposes of illustration and description. It is not intended to be exhaustive or to limit the present disclosure to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a display controller configured to perform a control to display an image area extracted from an undefined area other than a defined area that is defined in advance as a recognition target, on a confirmation screen for displaying a recognition result of characters entered in a document, wherein:
the display controller comprises a processor configured to perform any one of first processing, second processing, or third processing,
the first processing is processing of adding a first character string that is a recognition result of the image area, to an item of a recognition result of the document,
the second processing is processing of changing a second character string that is a recognition result of the defined area to the first character string, and
the third processing is processing of hiding the image area on the confirmation screen,
the defined area includes plural items, and
the display controller is configured to perform at least one of:
in a case of performing the first processing, processing of adding the first character string to an item closest to an end of a line extending from the image area, among the plural items; and
in a case of performing the second processing, processing of changing a character string of an item closest to an end of a line extending from the image area, among the plural items.

2. The information processing apparatus according to claim 1, wherein in a case where the first character string includes characters representing adding, the processor performs the first processing.

3. The information processing apparatus according to claim 1, wherein in a case where the first character string includes characters representing changing, the processor performs the second processing.

4. The information processing apparatus according to claim 1, wherein in a case where a specific image is included in the image area, the processor performs the third processing.

5. The information processing apparatus according to claim 4, wherein the specific image is an image representing a predetermined stamp.

6. The information processing apparatus according to claim 1, wherein
in the case of performing the first processing, the processor performs processing of adding the first character string to an item closest to the image area among the plural items.

7. The information processing apparatus according to claim 1, wherein
in the case of performing the first processing, the processor performs the processing of adding the first character string to an item closest to the end of the line extending from the image area, among the plural items.

8. The information processing apparatus according to claim 1, wherein
in the case of performing the second processing, the processor performs processing of changing a character string of an item closest to the image area among the plural items.

9. The information processing apparatus according to claim 1, wherein
the defined area includes plural items, and
in the case of performing the second processing, the processor performs the processing of changing the character string of the item closest to the end of the line extending from the image area, among the plural items.

10. The information processing apparatus according to claim 1, wherein the processor performs processing of adding the first character string that is the recognition result of the image area and an item given to the first character string, to a recognition result of the document, in association with each other.

11. The information processing apparatus according to claim 10, wherein
the first character string is recognized as plural character strings, and
the processor performs processing of adding each of the plural character strings and an item given to each of the plural character strings, to the recognition result of the document, in association with each other.

12. The information processing apparatus according to claim 1, wherein the confirmation screen switchably displays a first screen for displaying a second character string that is a recognition result of the defined area and a second screen for displaying the image area extracted from the undefined area.

13. The information processing apparatus according to claim 12, wherein in a case where the image area is extracted from the undefined area, the display controller performs a control to display the second screen while more highlighting the second screen than the first screen.

14. A non-transitory computer readable medium storing program causing a computer to execute information processing, the information processing comprising:
performing a control to display an image area extracted from an undefined area other than a defined area that is defined in advance as a recognition target, on a confirmation screen for displaying a recognition result of characters entered in a document,
wherein the controlling includes performing any one of first processing, second processing, or third processing,
the first processing is processing of adding a first character string that is a recognition result of the image area, to an item of a recognition result of the document,
the second processing is processing of changing a second character string that is a recognition result of the defined area to the first character string, and
the third processing is processing of hiding the image area on the confirmation screen,
the defined area includes plural items, and
the controlling includes at least one of:
in a case of performing the first processing, processing of adding the first character string to an item closest to an end of a line extending from the image area, among the plural items; and
in a case of performing the second processing, processing of changing a character string of an item closest to an end of a line extending from the image area, among the plural items.

15. An information processing apparatus comprising:
means for performing a control to display an image area extracted from an undefined area other than a defined area that is defined in advance as a recognition target, on a confirmation screen for displaying a recognition result of characters entered in a document,
wherein the means for performing the control includes performing any one of first processing, second processing, or third processing,
the first processing is processing of adding a first character string that is a recognition result of the image area, to an item of a recognition result of the document,
the second processing is processing of changing a second character string that is a recognition result of the defined area to the first character string, and
the third processing is processing of hiding the image area on the confirmation screen,
the defined area includes plural items, and
the controlling includes at least one of:
in a case of performing the first processing, processing of adding the first character string to an item closest to an end of a line extending from the image area, among the plural items; and
in a case of performing the second processing, processing of changing a character string of an item closest to an end of a line extending from the image area, among the plural items.

* * * * *